United States Patent Office 3,102,359
Patented Sept. 3, 1963

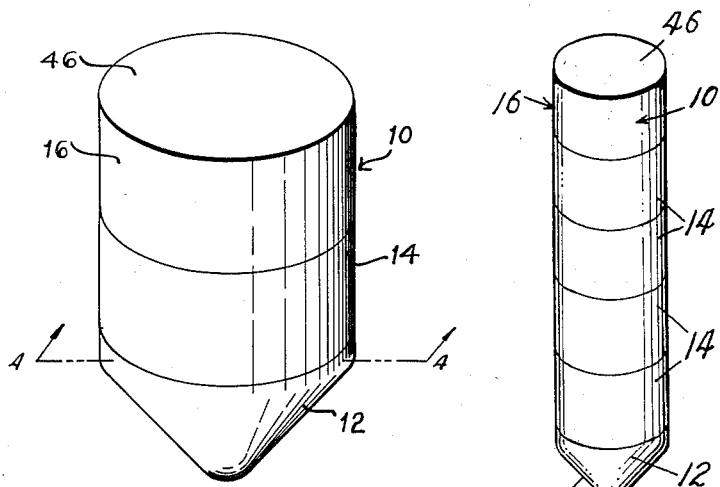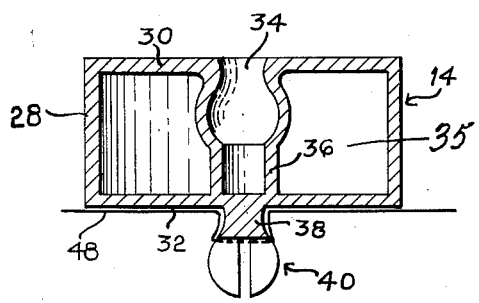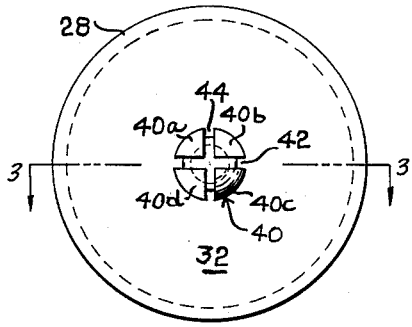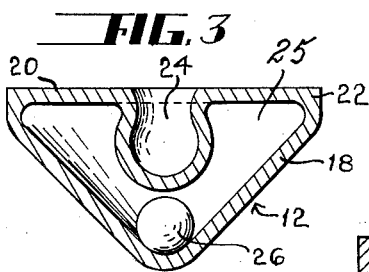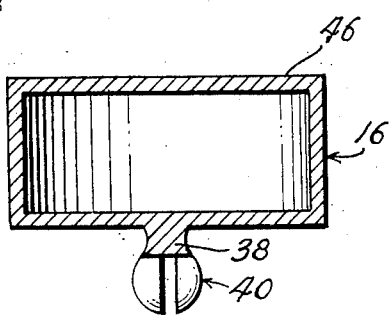
INVENTORS
JOHN L. CAHILL
PAUL V. CAHILL
THEIR ATTORNEYS

3,102,359
SIGNALLING DEVICE
John Lewis Cahill, 300 Lawver Lane, Dayton 31, Ohio, and Paul V. Cahill, 2808 Vale Drive, Dayton 20, Ohio
Filed Jan. 21, 1960, Ser. No. 3,831
9 Claims. (Cl. 43—43.14)

This invention relates to an indicator which may be fastened to a line or the like and used as a fishing float, buoy or a marker in water or on land, although not necessarily so limited.

An object of this invention is to provide an indicator made from a plurality of separable members superimposed one upon the other.

A further object of this invention is to provide an indicator made from a plurality of superimposed, separable members which are attached to a line or the like.

Other objects and advantages reside in the construction of parts, the combination thereof, the method of manufacture and the mode of operation, as will become more apparent from the following description.

Referring to the drawings:

FIGURE 1 is a perspective view of an indicator made according to this invention.

FIGURE 2 is an enlarged end view of one of the separable members utilized in the indicator of FIGURE 1.

FIGURE 3 is an enlarged sectional view of one of the members used in the indicator of this invention, taken substantially along the lines 3—3 of FIGURE 2.

FIGURE 4 is an enlarged sectional view of another of the members used in the indicator of this invention, taken substantially along lines 4—4 of FIGURE 1.

FIGURE 5 is an enlarged sectional view of the top member used in the indicator.

FIGURE 6 is a reduced disclosure of several body members stacked and snapped together one upon the other.

According to this invention, an indicator 10 is provided having, in abutting relation, a base member 12, a body member 14 and a top member 16. As will be apparent from the disclosure below, several body members 14 may be stacked and snapped together one upon the other to form an elongate, generally cylindrical indicator.

Referring to FIGURE 4, base member 12 is generally in the form of a cone, having a conical side surface 18 and a planar end face or surface 20 provided with a depending, annular flange 22 engaging surface 18. The interior of the base section 12 is hollow, so that the base section is as light as possible. The end face or surface 20 is provided with a centrally located, hollow socket member 24 extending inwardly into the hollow substantially spherical cavity 25 of the cone. To give stability to the indicator 10, that is, to hold the indicator 10 upright when suspended or thrown free, a spherical weight 26 is provided within the interior of the hollow cone or base 12. It should be noted that the sides of the socket member 24 extend sufficiently near the conical side surface 18 of the base member so that the weight 26 is confined within the nose of the base as shown in FIGURE 4.

The body member 14 is shown in FIGURES 2 and 3 as being a cylinder having a cylindrical side 28 and planar top and bottom surfaces 30 and 32, respectively. A hollow socket 34 is provided centrally of the planar top surface 30, extending to the hollow interior 35 of the body member 14 in much the same fashion as the socket 24 extends into the base 18. To enhance the rigidity of the body member 14, the sides of the socket 34 engage with a cylindrical support element 36 which extends to the bottom planar surface 32. A lug or boss 38 is provided centrally of the bottom planar surface 32. The lug 38 includes a ball portion 40 made from a plurality of segments 40a, 40b, 40c, and 40d which are separated by perpendicular channels 42 and 44. With the ball structure shown having plural segments, the ball is sufficiently flexible to be forced into the socket 34 so that the body member 14 is snap fastened into abutment with the base member 12. Also, several identical body members 14 may be stacked or superimposed one upon the other by snapping balls 40 into mating sockets 34.

The top member 16 is similar to the body members 14, in that it is provided with a socket extending from the base thereof. The top member 16 differs from the body members 14 only in that the interior is entirely hollow, that is, no socket 34 is formed therein, and therefore, it has a top surface 46 forming an unbroken plane.

Preferably, the members 12, 14, and 16 are made from a plastic or a light metal so as to be buoyant and thereby float on water. Since each of these members have generally hollow interiors, the device is lightweight and the weight is centered substantially in the nose of base member 12. Accordingly, as pointed out above, if the device is suspended or thrown free into water, it will remain upright. Also, for the indicator 10 to present a smooth surface, the diameter and circumference of each of the body members 14 and the top member 16 are identical with the largest diameter and circumference of the conical base 12.

The indicator 10 may be attached to a line or the like by simply coursing the line, as shown at 48, through one of the channels 42 or 44 provided in the ball portion 40 of the lug 38. When the body member 14 with the line 48 mounted in one of the channels is fastened by snapping the ball portion into the socket of an adjacent body member or to the base member 12, the line is firmly clamped between the two abutting faces of the fastened members.

Since the indicator 10 is made of a plurality of hollow sections with a weight at the bottom thereof, it is very flexible in use. For example, it may float on water and act as a buoy, or it may be attached to a line for use as a fishing float. Furthermore, several indicators 10 may be suspended in air by means of lines 48, or the like, to serve as course markers. When used as markers on land or as buoys on the water, it may be desirable to use several body members 14 in each indicator 10, so that each indicator will stand out more effectively against its background. Furthermore, the buoyany is increased by increasing the number of body members 14. For a fishing float, only one member 14 and member 12 may be clamped on the fishing line. If the floats are used in suspending a fishing net, each group of members 14 in an assembly consists of a sufficient number to suspend its portion of the net. To this end, it is desirable that the individual sections are brightly colored, and that different sections will have different colors.

These markers may also be used when exploring unknown places such as woods, caves, etc. In so doing, members 14 may be dropped along the way to properly mark the return route. Furthermore, these markers may be used by armed forces when reconnoitering. When returning, the markers may be picked up for use on another trip.

If the markers 14 and 12 are to be used at night or in dark places, one or more of the markers of each set may have incorporated therein or thereon luminescent paint or dyes, so that the markers are visible in the dark.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. In an indicating device for use as a fishing float and for attachment to a line or the like, the combination comprising: a buoyant base member having a substantially conical surface and a planar surface, said surfaces forming substantially a cone, said planar surface having a centrally located spherical socket extending into said cone; a cylindrical body member provided with a pair of planar end faces, a ball provided on one of said end faces mating with said socket, said ball being formed by a plurality of segments separated by channels for receiving a portion of a line and for rendering the ball sufficiently flexible to be snap fit within said socket, whereby the line is firmly held between the base member and the body member when the ball is fit within said socket.

2. In an indicating device for use as a fishing float, the combination comprising: a plurality of hollow body members connected in abutting relation, each of said body members comprising a pair of parallel end faces, one of said faces having a hollow, substantially spherical socket member extending into said member, a lug including a ball portion extending from the other of said faces, said ball portion being formed by a plurality of segments separated by channels rendering said ball portion flexible, said body members being connected in abutment by fastening mating balls and sockets, whereby an elongate cylindrical indicator is formed and whereby a line may be clamped between adjoining body members by passing a line through one of the channels in one of said ball portions before the body members are fastened.

3. In a fishing float, the combination, comprising: a hollow base member having a substantially conical surface and a planar surface substantially forming a cone, said planar surface having a centrally located socket extending into said member; and a plurality of hollow cylindrical body members, each having two parallel end faces, a substantially spherical fastening lug depending from one of said end faces, the other of said end faces having an inwardly extending substantially spherical socket located centrally thereof, whereby one of said body members is fastened in abutment with said base member by a lug and socket joint and the body members are fastened in abutment one to the other by mating said lugs and sockets.

4. In an indicator, the combination, comprising: a hollow base member having a substantially conical surface and a planar surface forming a cone, said planar surface having a centrally located socket extending into said member; a plurality of hollow cylindrical body members, each having two parallel end faces, a substantially spherical fastening lug depending from one of said end faces, the other of said end faces having an inwardly extending substantially spherical socket located centrally thereof, whereby one of said body members is fastened in abutment with said base member by a lug and socket joint and the body members are fastened in abutment one to the other by mating said lugs and sockets; and a weight provided in said base member for retaining the indicator upright.

5. The combination of claim 4, in which the circumference of said body members is the same as the widest portion of said base member.

6. The combination of claim 4 further including a cylindrical top member having a pair of planar end faces, one end face being provided with a lug including a flexible fastening member extending therefrom for engagement with the socket of an adjacent body member and the other end face being unbroken.

7. The combination of claim 4, in which said weight is a ball element and in which the socket in said base member extends sufficiently near the sides of the cone to confine said ball element to the nose of said cone.

8. The combination of claim 3, in which the circumference of said body members is the same as the widest portion of said base member.

9. The combination of claim 3 further including a cylindrical top member having a pair of planar end faces, one end face being provided with a lug including a flexible fastening member extending therefrom for engagement with the socket of an adjacent body member and the other end face being unbroken.

References Cited in the file of this patent

UNITED STATES PATENTS

| | | |
|---|---|---|
| 1,170,109 | Rogers | Feb. 1, 1916 |
| 2,226,331 | Allison | Dec. 24, 1940 |
| 2,770,909 | Illgner | Nov. 20, 1956 |
| 2,863,253 | Hettinger | Dec. 9, 1958 |
| 2,881,552 | Miller | Apr. 14, 1959 |
| 2,972,833 | LaGrutta | Feb. 28, 1961 |

FOREIGN PATENTS

| | | |
|---|---|---|
| 221,755 | Great Britain | Sept. 18, 1924 |
| 400,355 | Great Britain | Oct. 26, 1933 |
| 1,198,239 | France | June 8, 1959 |